United States Patent
Zurewich et al.

(10) Patent No.: US 10,336,492 B2
(45) Date of Patent: Jul. 2, 2019

(54) SEALING JAWS FOR BAGGING APPARATUS

(71) Applicant: DYCO, INC., Bloomsburg, PA (US)

(72) Inventors: Thomas M. Zurewich, Orangeville, PA (US); Peter D. Yohe, Bloomsburg, PA (US)

(73) Assignee: DYCO, INC., Bloomsburg, PA (US)

(*) Notice: Subject to any disclaimer, the term of this patent is extended or adjusted under 35 U.S.C. 154(b) by 382 days.

(21) Appl. No.: 15/011,774

(22) Filed: Feb. 1, 2016

(65) Prior Publication Data
US 2016/0272355 A1   Sep. 22, 2016

Related U.S. Application Data

(60) Provisional application No. 62/135,844, filed on Mar. 20, 2015.

(51) Int. Cl.
| | |
|---|---|
| B65B 59/04 | (2006.01) |
| B65B 51/14 | (2006.01) |
| B29C 65/00 | (2006.01) |
| B29C 65/22 | (2006.01) |
| B29L 31/00 | (2006.01) |

(52) U.S. Cl.
CPC ............ *B65B 59/04* (2013.01); *B29C 65/222* (2013.01); *B29C 65/228* (2013.01); *B29C 65/229* (2013.01); *B29C 66/0044* (2013.01); *B29C 66/1122* (2013.01); *B29C 66/43* (2013.01); *B29C 66/43121* (2013.01); *B29C 66/8167* (2013.01); *B29C 66/83221* (2013.01); *B29C 66/849* (2013.01); *B29C 66/8511* (2013.01); *B29C 66/876* (2013.01); *B65B 51/146* (2013.01); *B29C 66/8122* (2013.01); *B29L 2031/7128* (2013.01)

(58) Field of Classification Search
CPC ..... B65B 59/04; B29C 65/222; B29C 65/228; B29C 65/229; Y10T 279/17179; Y10T 279/17188; Y10T 279/17786; B23B 31/1074; B23Q 1/0072
USPC .......... 219/769, 243, 209; 53/451, 551, 477, 53/285, 329.2, 370.7, 371.2, 371.5, 371.6, 53/373.7, 374.2, 375.9, 376.6; 493/206, 493/209; 156/380.4, 380.6, 358; 279/9.1–105.1, 155; 425/451.9
See application file for complete search history.

(56) References Cited

U.S. PATENT DOCUMENTS

| | | | | |
|---|---|---|---|---|
| 2,716,393 | A * | 8/1955 | Fischer | B25D 17/08 173/169 |
| 3,579,407 | A * | 5/1971 | Rochla | B65B 51/18 156/366 |
| 3,762,264 | A * | 10/1973 | Scott | B21D 28/34 279/4.12 |

(Continued)

*Primary Examiner* — Gloria R Weeks
*Assistant Examiner* — Dariush Seif
(74) *Attorney, Agent, or Firm* — McNees Wallace & Nurick LLC

(57) ABSTRACT

A bagging apparatus including a first jaw, a second jaw, at least one of the first jaw and the second jaw being movable. The first jaw and second jaw are movable relative to each other between a first position for joining at least a portion of two sheets together and a second position associated with release of the two sheets, the two sheets forming at least a portion of a bag. At least one of the first jaw and the second jaw being removable from the apparatus without tools.

14 Claims, 14 Drawing Sheets

(56) References Cited

U.S. PATENT DOCUMENTS

| | | | | |
|---|---|---|---|---|
| 4,846,517 | A * | 7/1989 | Boke | B29C 31/00 |
| | | | | 294/65 |
| 5,015,003 | A * | 5/1991 | Ramunas | B23B 31/16275 |
| | | | | 269/284 |
| 5,174,694 | A * | 12/1992 | Voellmer | B23B 31/103 |
| | | | | 279/79 |
| 5,277,745 | A * | 1/1994 | Williams | B26D 7/27 |
| | | | | 156/515 |
| 5,321,230 | A * | 6/1994 | Shanklin | B29C 65/229 |
| | | | | 156/515 |
| 5,845,912 | A * | 12/1998 | Grupa | B23B 31/16275 |
| | | | | 279/124 |
| 6,789,371 | B1 * | 9/2004 | Buysman | B29C 65/229 |
| | | | | 53/373.7 |
| 6,966,562 | B1 * | 11/2005 | Wienhold | B23B 31/1071 |
| | | | | 279/155 |
| 2004/0256373 | A1 * | 12/2004 | Irwin | B65B 9/067 |
| | | | | 219/243 |
| 2006/0086709 | A1 * | 4/2006 | Schneider | B23K 9/282 |
| | | | | 219/138 |
| 2007/0289261 | A1 * | 12/2007 | Rogers | B65B 43/465 |
| | | | | 53/467 |
| 2011/0167772 | A1 * | 7/2011 | Piucci, Jr. | B29C 65/18 |
| | | | | 53/477 |
| 2012/0279171 | A1 * | 11/2012 | Praesenz | B65B 7/164 |
| | | | | 53/285 |
| 2013/0067859 | A1 * | 3/2013 | Kult | B65B 59/04 |
| | | | | 53/287 |
| 2014/0062039 | A1 * | 3/2014 | Pocock | B23B 31/102 |
| | | | | 279/133 |

* cited by examiner

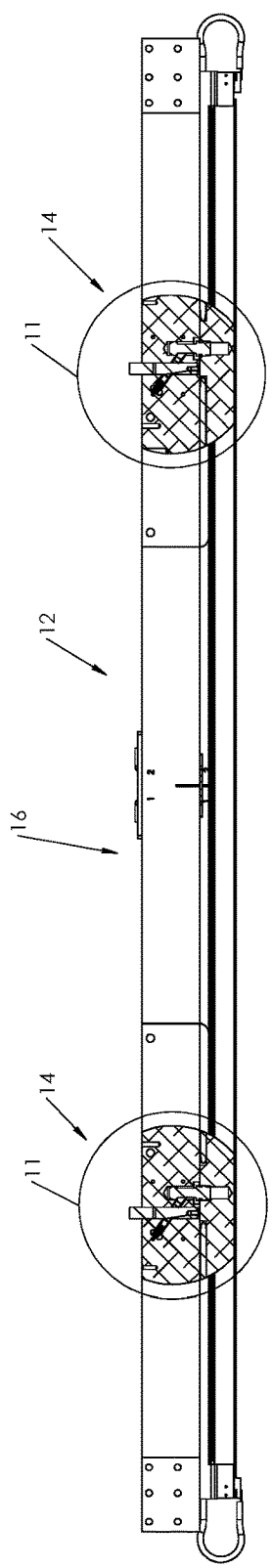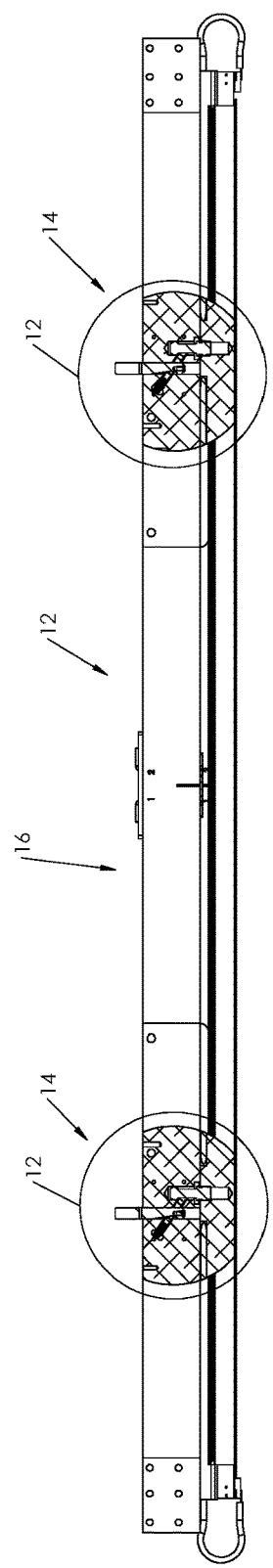

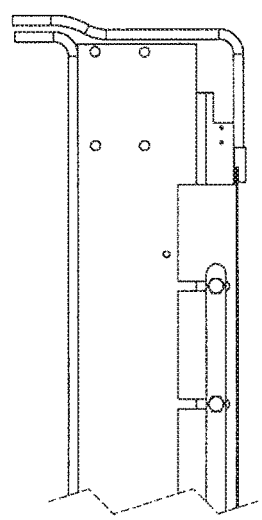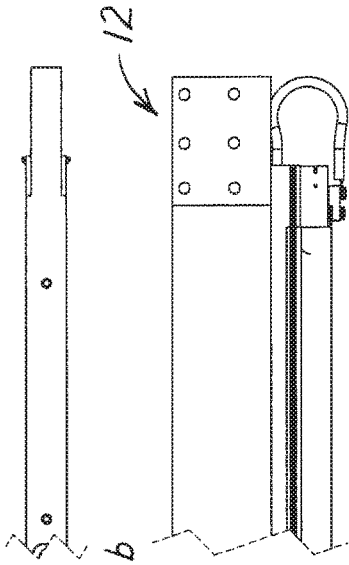
FIG. 15b  (PRIOR ART) FIG. 15  FIG. 16b  FIG. 16
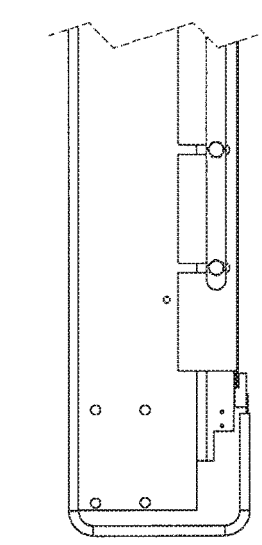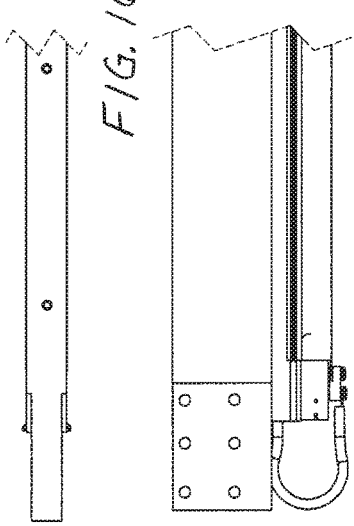
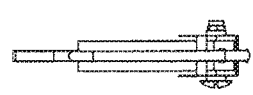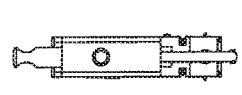
FIG. 15a  FIG. 16a

SEALING JAWS FOR BAGGING APPARATUS

FIELD OF THE INVENTION

The present invention is directed to sealing jaws for bagging apparatus.

BACKGROUND OF THE INVENTION

It has become desirable in many industries to place articles in bags instead of boxes in preparation for shipping. Bag sheets are positioned between sealing jaws that are brought together to form a seal along the periphery of a bag. Currently, removal/replacement/maintenance of the sealing jaws can be a time-consuming and cumbersome task, resulting in nonproductive "down time" of the bagging apparatus, and risk of tool damage to the sealing jaws associated with their removal/replacement/maintenance.

It would be desirable in the art for a sealing jaw and method for sealing jaw removal/replacement/maintenance that does not suffer from these deficiencies.

BRIEF DESCRIPTION OF THE INVENTION

In an embodiment, a bagging apparatus includes a first jaw, a second jaw, at least one of the first jaw and the second jaw being movable. The first jaw and second jaw are movable relative to each other between a first position for joining at least a portion of two sheets together and a second position associated with release of the two sheets, the two sheets forming at least a portion of a bag. At least one of the first jaw and the second jaw is removable from the apparatus without tools.

In another embodiment, a sealing jaw for use with a bagging apparatus includes a removable jaw having a guide/retention member selectively releasable from a jaw holder. The jaw holder includes a retainer assembly having a release member movable between a first position for securing the guide/retention member therewith, and a second position for releasing the guide/retention member therefrom. Selective release of the guide/retention member from the jaw holder is achieved without tools.

In yet another embodiment, a method for assembling/disassembling a sealing jaw for use with a bagging apparatus includes inserting a guide/retention member of a removable jaw inside a retainer assembly of a jaw holder, the retainer assembly having a release member movable between a first position for securing the guide/retention member therewith, and a second position for releasing the guide/retention member therefrom. The method further includes actuating the release member to the first position prior to or subsequent to inserting the guide/retention member inside of the retainer assembly, achieving assembly of the sealing jaw. The method further includes, subsequent to achieving assembly of the sealing jaw, actuating the release member to the second position, and withdrawing the guide/retention member from the retainer assembly, achieving disassembly of the sealing jaw. Assembling/disassembling of the sealing jaw is achieved without tools.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 9 is a side view of an exemplary sealing jaw.

FIG. 10 is a side view of an exemplary sealing jaw.

FIGS. 15, 15a and 15b are orthogonal views of a prior art sealing jaw taken from FIG. 1.

FIGS. 16, 16a and 16b are orthogonal views of a sealing jaw taken from FIG. 3.

Wherever possible, the same reference numbers will be used throughout the drawings to represent the same parts.

DETAILED DESCRIPTION OF THE INVENTION

Figure 1:
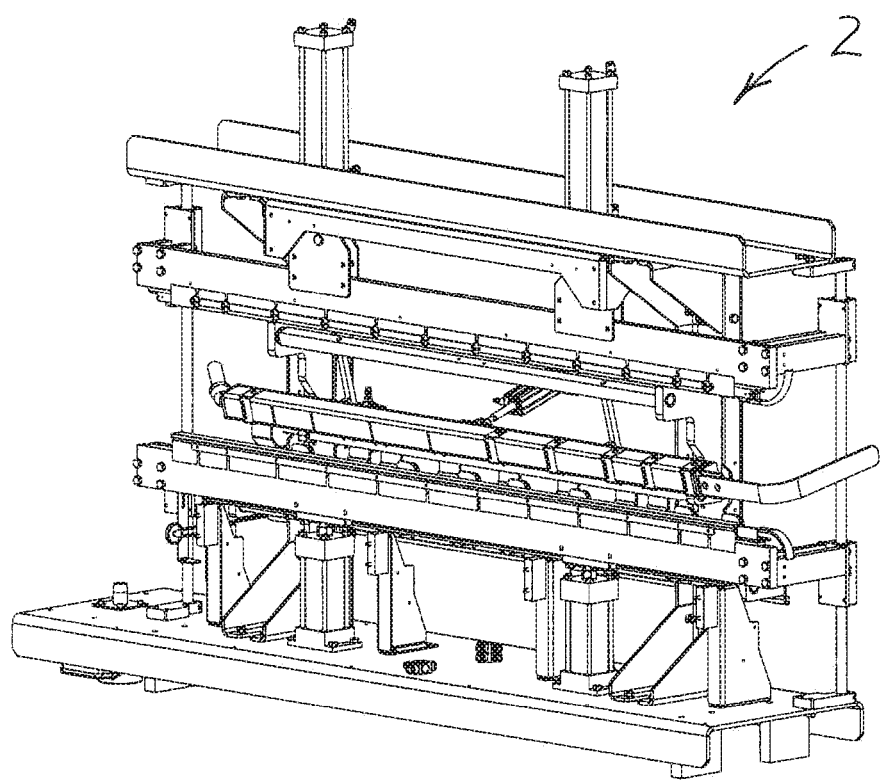
FIG. 1 is an outboard-looking partial perspective view of a prior art bagging apparatus.

A prior art portion of a bagging apparatus 2 is shown in FIG. 1. In order to remove a sealing jaw, prior art bagging apparatus 2 requires tools to remove multiple mechanical fasteners, which fasteners mechanically securing the sealing jaw to the bagging apparatus, as well as securing electrical connections between the sealing jaw and the bagging apparatus.

Figure 2:
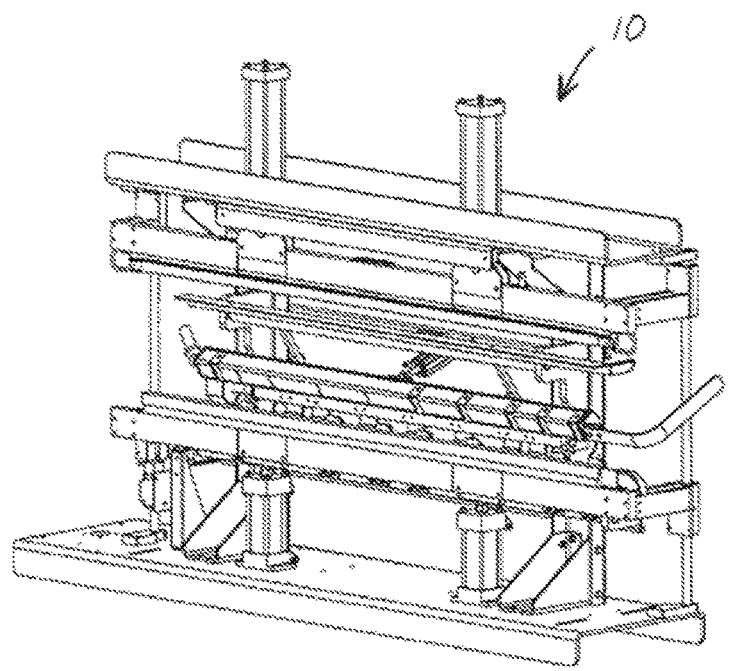
FIG. 2 is an outboard-looking partial perspective view of an exemplary bagging apparatus.

In contrast, FIG. 2 shows an exemplary portion of a bagging apparatus 10 that permits installation and removal of the jaw from the bagging apparatus without tools. The term "without tools" is believed to be self explanatory, at the least, the magnitude of forces and level of manual dexterity associated with successfully achieving installation and removal of a given task would be possessed by any worker that would otherwise be able to use tools in order to achieve the same task. In addition, an exemplary bagging apparatus provides a compliant plug mount for providing "float" in a plane, greatly simplifying installation of the jaw. Additionally, an exemplary bagging apparatus permits installation/removal of sheet material required for use with the jaw. Each of these beneficial features/capabilities will be discussed in further detail below.

Figure 5:
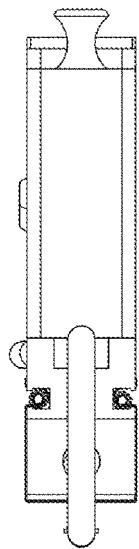
FIG. 5 is a side view of the sealing jaw of FIG. 3.
Figure 3:
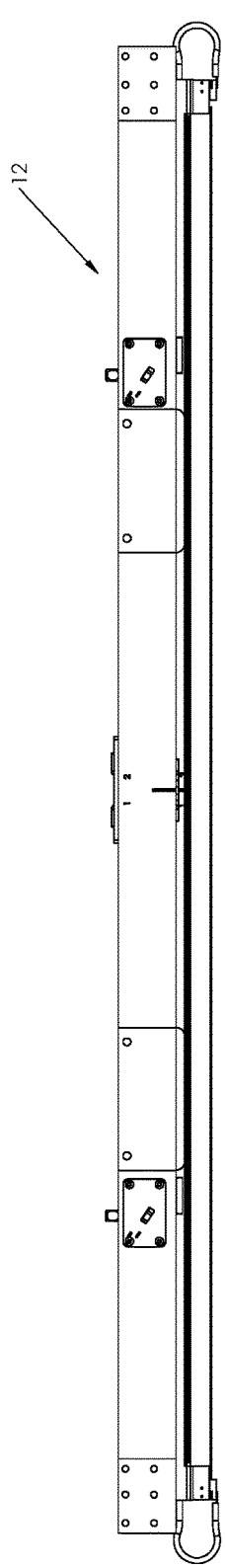
FIG. 3 is a front view of an exemplary sealing jaw.
Figure 4:
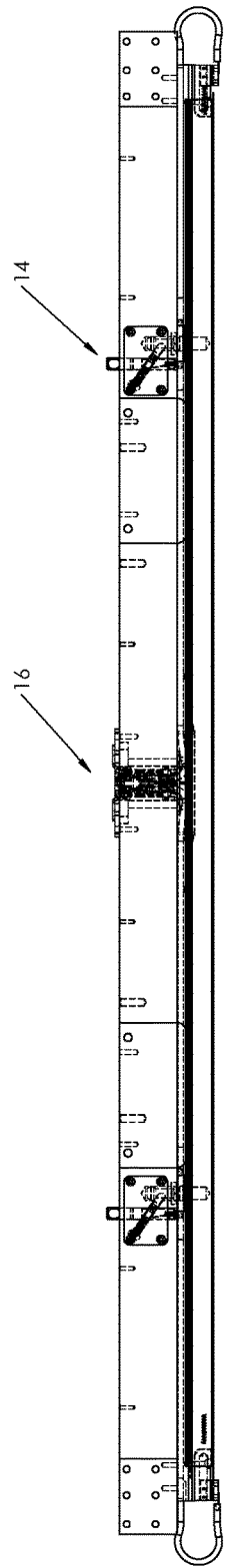
FIG. 4 is a cutaway view of the sealing jaw of FIG. 3.

Referring to FIG. 3, a sealing jaw 12 is shown. As shown in FIG. 4, which is a partial cutaway view of FIG. 3, a retainer assembly 14 and a compliant plug mount 16 is shown. FIG. 5 is an end view of FIG. 3.

Figure 6:
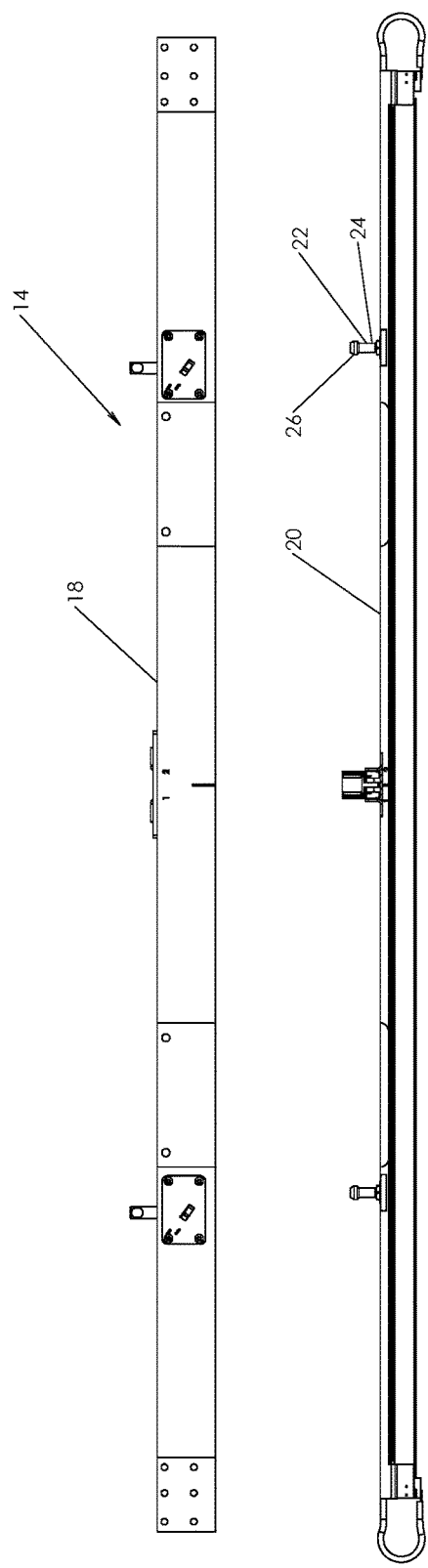
FIG. 6 is a side view of a partially disassembled exemplary sealing jaw.

As shown in FIG. 6, sealing jaw 12 (FIG. 3) comprises a jaw holder 18 that is selectively removable from jaw 20. Removable jaw 20 includes a pair of guide/retention members 22 that each extend outwardly from removable jaw 20. In another embodiment, a number of guide/retention member(s) different than one pair (i.e., two) may be used. In one embodiment, guide/retention member 22 includes an outwardly extending post 24 terminating in a guide/retention feature 26. Retainer assembly 14 includes components contained in jaw holder 18 as well as guide/retention member 22.

Figure 7:
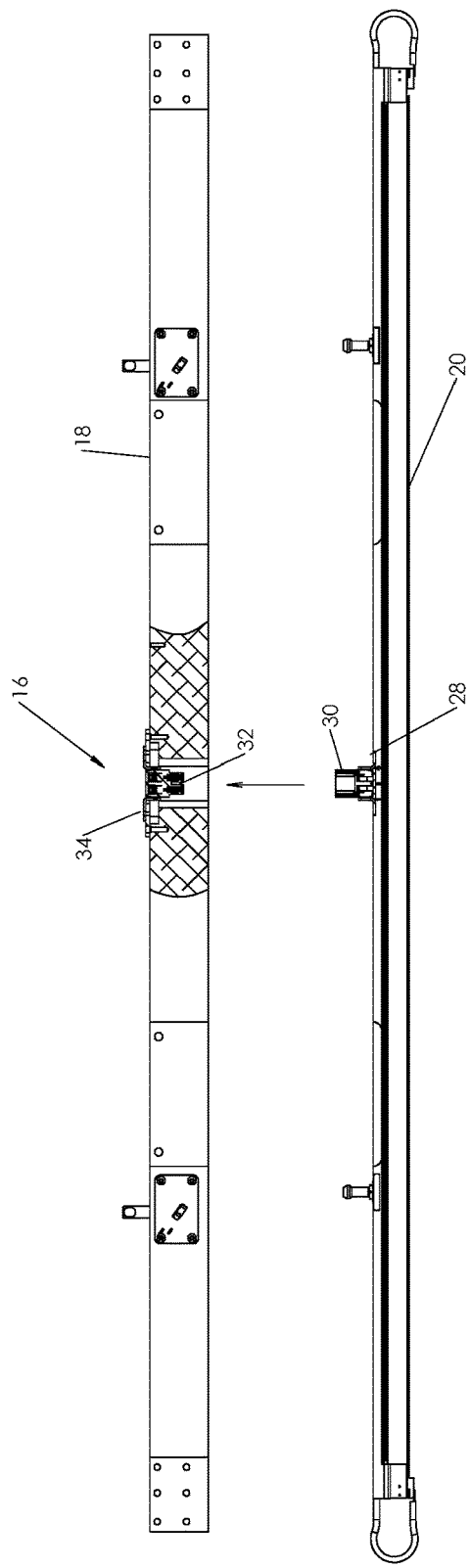
FIG. 7 is a cutaway view of the partially disassembled sealing jaw of FIG. 6.

As shown in FIG. 7, compliant plug mount 16 includes connector mounting structure 28 secured to removable jaw 20 for securing a male electrical connector 30 thereto. Compliant plug mount 16 further includes a connector mounting structure 34 secured to jaw holder 18 for securing a mating electrical connector 32 thereto, as will be discussed in further detail below.

Figure 8:
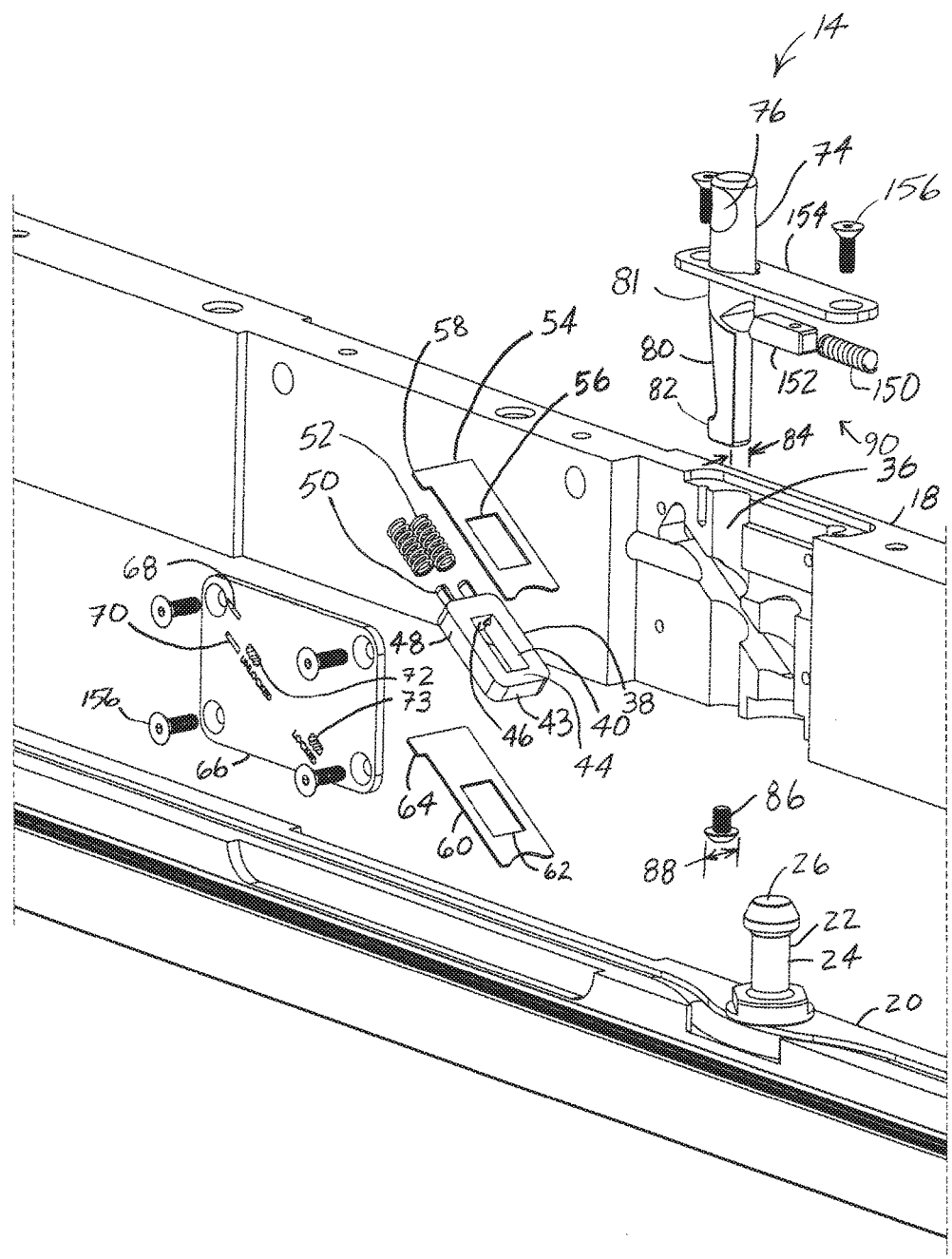
FIG. 8 is an exploded view of an exemplary retainer assembly.

FIG. 8 shows an exploded view of retainer assembly 14. Cavity 36 is formed in jaw holder 18 for securing components that are associated with selectively connecting jaw holder 18 to removable jaw 20 (i.e., engaging guide/retention member 22 of removable jaw 20) as well as permitting selective disconnection between jaw holder 18 and removable jaw 20 (i.e., disengaging guide/retention member 22 of removable jaw 20).

As further shown in FIG. 8, retainer assembly 14 includes a dog 38 having a slot 40 formed therethrough and a pair of spring pins 50 extending from one end of dog 38. Spring pins 50 each receive a spring 52 for urging movement of dog 38 as a result of springs 52 being compressed between dog 38 and a corresponding portion of cavity 36, the position of dog 38 relative to cavity 36 being controlled by the amount of insertion of release member 74 inside of cavity 36. Dog 38 includes an end 43 opposite spring pins 50 and an end retention surface 44 in proximity to end 43 for engaging guide/retention feature 26 of guide/retention member 22.

As further shown in FIG. 8, dog 38 is positioned between a guide 54 having a slot 56 corresponding to slot 40 of dog 38, as well as a guide 60 having a slot 62 similarly corresponding to slot 40 of dog 38 for mutually receiving a wedge portion 80 of release member 74. To help secure guides 54, 60 and dog 38 inside of cavity 36, a cover plate 66 is installed. Cover plate 66 includes slots 68, 70 engaging respective tabs 58, 64 of guides 54, 60. Cover plate 66 further includes windows 72, 73 for a portion of a surface 48 of dog 38. That is, a portion of surface 48 of dog 38 can be viewed or is visually evident through window 72 when release member 74 is in a disengaged or unlocked position relative to guide/retention member 22. A different portion of surface 48 of dog 38 can be viewed or is visually evident through window 73 when release member 74 is in an engaged or locked position relative to guide/retention member 22.

As further shown in FIG. 8, retainer assembly 14 includes release member 74 having a gripping portion 76 that extends outwardly from an upper surface of cover plate 154 of jaw holder 18 that is secured to jaw holder 18 by fasteners 156. Release member 74 extends to a non-wedged transition portion 81, then to wedge portion 80 and terminates at an end 82. End 82 and wedge portion 80 are directed inside of cavity 36 and through slots 56, 40, 62 of respective guide 54, dog 38 and guide 60. Non-wedged transition portion 81 and wedge portion 80 of release member 74 has a width 84 that is less than the width of slots 56, 40, 62 of respective guide 54, dog 38 and guide 60 to permit insertion therethrough. A fastener 86 is threadedly engaged in end 82 of release member 74, the head of fastener 86 having a width 88 greater than the width of slots 56, 40, 62 of respective guide 54, dog 38 and guide 60 to prevent inadvertent removal of release member 74 from cavity 36.

Figure 11:
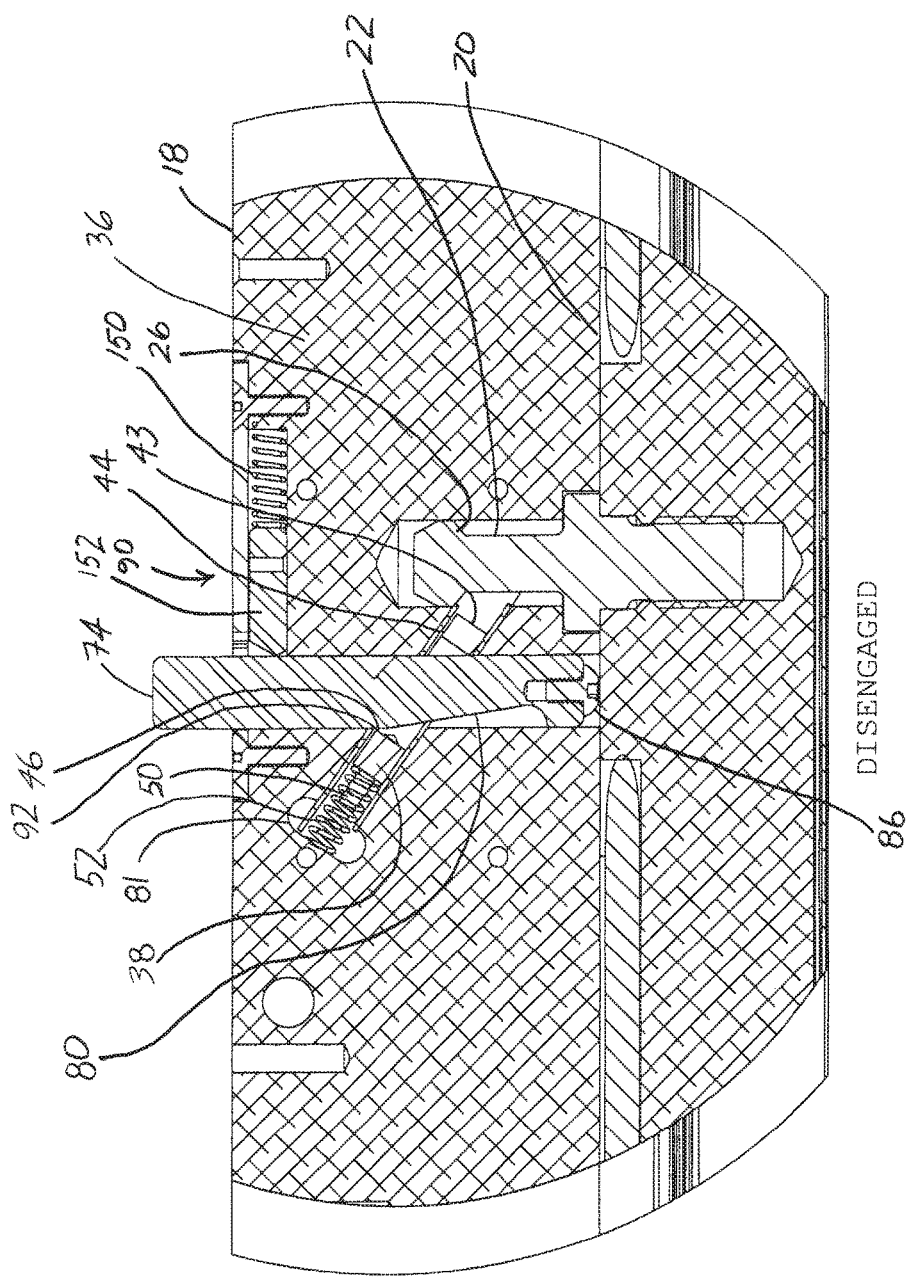
FIG. 11 is taken from region 11 of FIG. 9 of an exemplary retainer assembly in a disengaged position.

FIG. 9 includes regions 11 which correspond to FIG. 11 showing a section cut through retainer assembly 14 in the disengaged position.

FIG. 11 shows jaw holder 18 disengaged from removable jaw 20. Stated another way, guide/retention member 22 is not prevented from removal from cavity 36 by dog 38. As further shown in FIG. 11, contact surface 46 (FIG. 8) of dog 38 is maintained in contact with wedge portion 80 (and then in contact with non-wedged transition portion 81 if release member 74 is sufficiently inserted inside of cavity 36) by virtue of a retention force generated by compressed springs 52 positioned between cavity 36 and one end of dog 38, as previously discussed. Upon release member 74 being sufficiently inserted inside of cavity 36 such that contact surface 46 is brought into contact with non-wedged transition portion 81, a neutral contact point or neutral contact position 92 is achieved. That is, the position of release member 74 relative to cavity 36 becomes stable, absent application of a force along the axis of release member 74. As further shown in FIG. 11, at neutral contact position 92, end 43 of dog 38 is moved out of the path of guide/retention feature 26 of guide/retention member 22 within cavity 36, such that removable jaw 20 may be disengaged from jaw holder 18.

Figure 12:
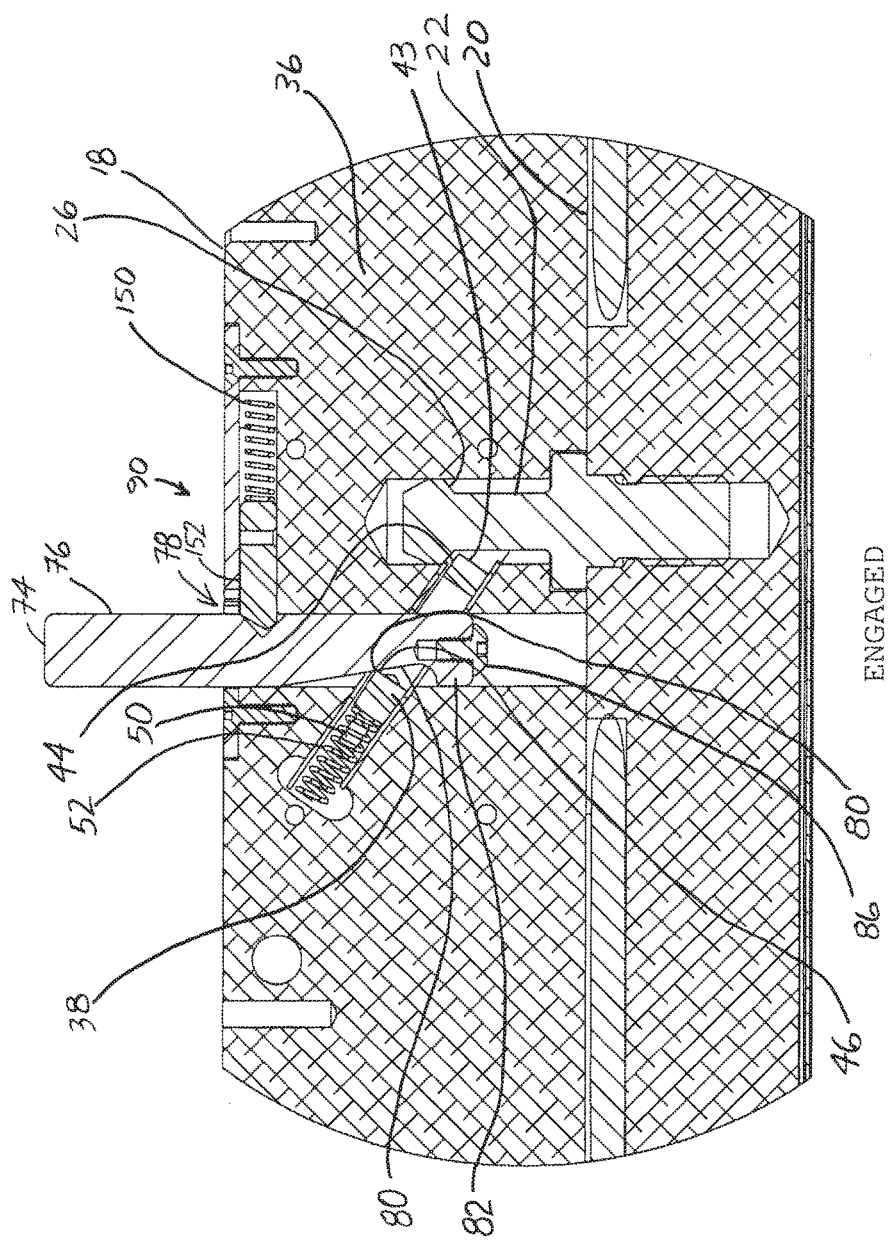
FIG. 12 is taken from region 12 of FIG. 10 of an exemplary retainer assembly in an engaged position.
Figure 18:
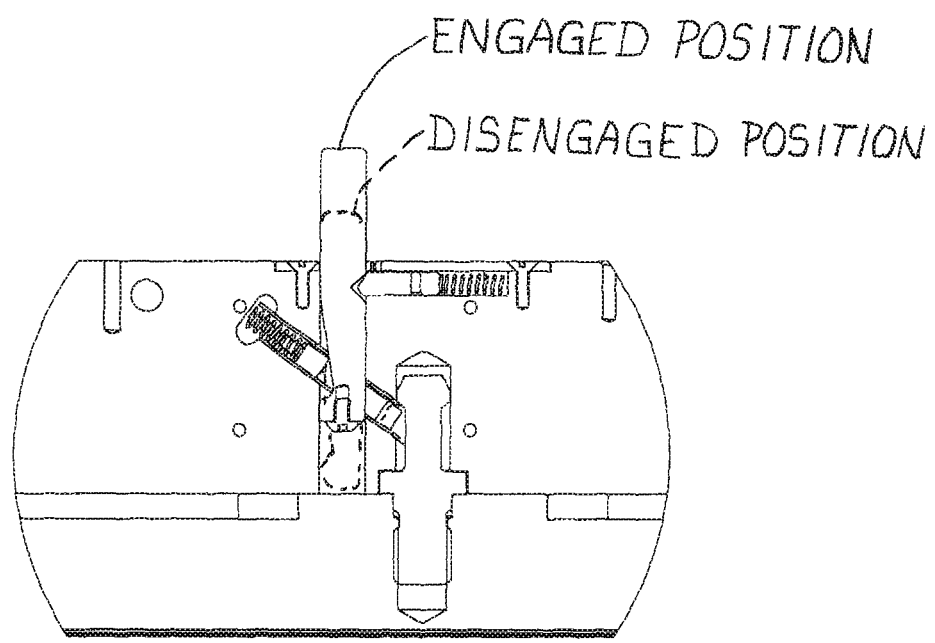
FIG. 18 is a simplified outline drawing of FIG. 12.

FIG. 10 includes region 12 which corresponds to FIG. 12 showing a section cut through retainer assembly 14 in the engaged position. FIG. 18 is an outline drawing of FIG. 12 that is provided to show interacting components/features without encumbrances of cross-hatched lines.

FIG. 12 shows jaw holder 18 engaged with removable jaw 20. Stated another way, guide/retention member 22 is prevented from removal from cavity 36 by dog 38. As further shown in FIG. 12, contact surface 46 (FIG. 8) of dog 38 is maintained in contact with wedge portion 80 (and then in contact with end 82 if release member 74 is sufficiently removed from inside of cavity 36) by virtue of a retention force generated by compressed springs 52 positioned between cavity 36 and one end of dog 38, as previously discussed. Upon release member 74 being sufficiently removed from inside of cavity 36, contact surface 46 is brought into contact with end 82 of release member 74, such contact prevents further removal of release member 74 from cavity 36. As further shown in FIG. 12, once contact surface 46 is brought into contact with end 82 of release member 74, end 43 and end retention surface 44 of dog 38 is moved into the path of guide/retention feature 26 of guide/retention member 22, such that removable jaw 20 is engaged with (i.e., not removable from) jaw holder 18. It is to be understood that while guide/retention feature 26 of guide/retention member 22, when fully inserted inside of cavity 36, cannot be removed from cavity 36 so long as contact surface 46 is brought into contact with end 82 of release member 74 (engaged position), it is possible to insert guide/retention feature 26 of guide/retention member 22 into cavity 36, if sufficient insertion force is applied by guide/retention feature 26 of guide/retention member 22 to overcome the retention force generated by springs 52 (FIG. 8). In other words, if guide/retention member 22 is fully inserted inside of cavity 36 and end 43 and end retention surface 44 of dog 38 is positioned in the path of guide/retention feature 26 of guide/retention member 22 (engaged position), guide/retention member 22 cannot be disengaged. However, if guide/retention member 22 has not been inserted inside of cavity 36 (disengaged from jaw holder 18), upon application of a sufficient insertion force by guide/retention member 22, guide/retention member 22 can thereby be transitioned from the disengaged position to the engaged position.

To secure retainer assembly 14 in an engaged position, i.e., preventing retainer assembly 14 from achieving an inadvertent disengaged position (FIG. 11), a retention device 90, includes, for example, a spring 150 and a cooperating member 152, with cooperating member 152 being maintained in physical contact with release member 74, with release member 74 and cooperating member having engagement features 78, such a notch and protrusion arrangement as shown in FIG. 8. Engagement features 78 become matingly engaged with each other when mutually aligned, such when release member 74 is positioned in the engaged position. A sufficient force in a direction moving gripping portion 76 of release member 74 toward cavity 36 is required overcome the contact force applied by spring 150 to disengage engagement features 78, with an applied force of reduced magnitude in the same direction urging release member 74 toward the disengaged position. Retention device 90 is self-contained. That is, the component parts are retained together when the retention device is disengaged from the release member. Moreover, retention device 90 is entirely positioned interior of jaw holder 18 in cavity 36.

Figure 13:
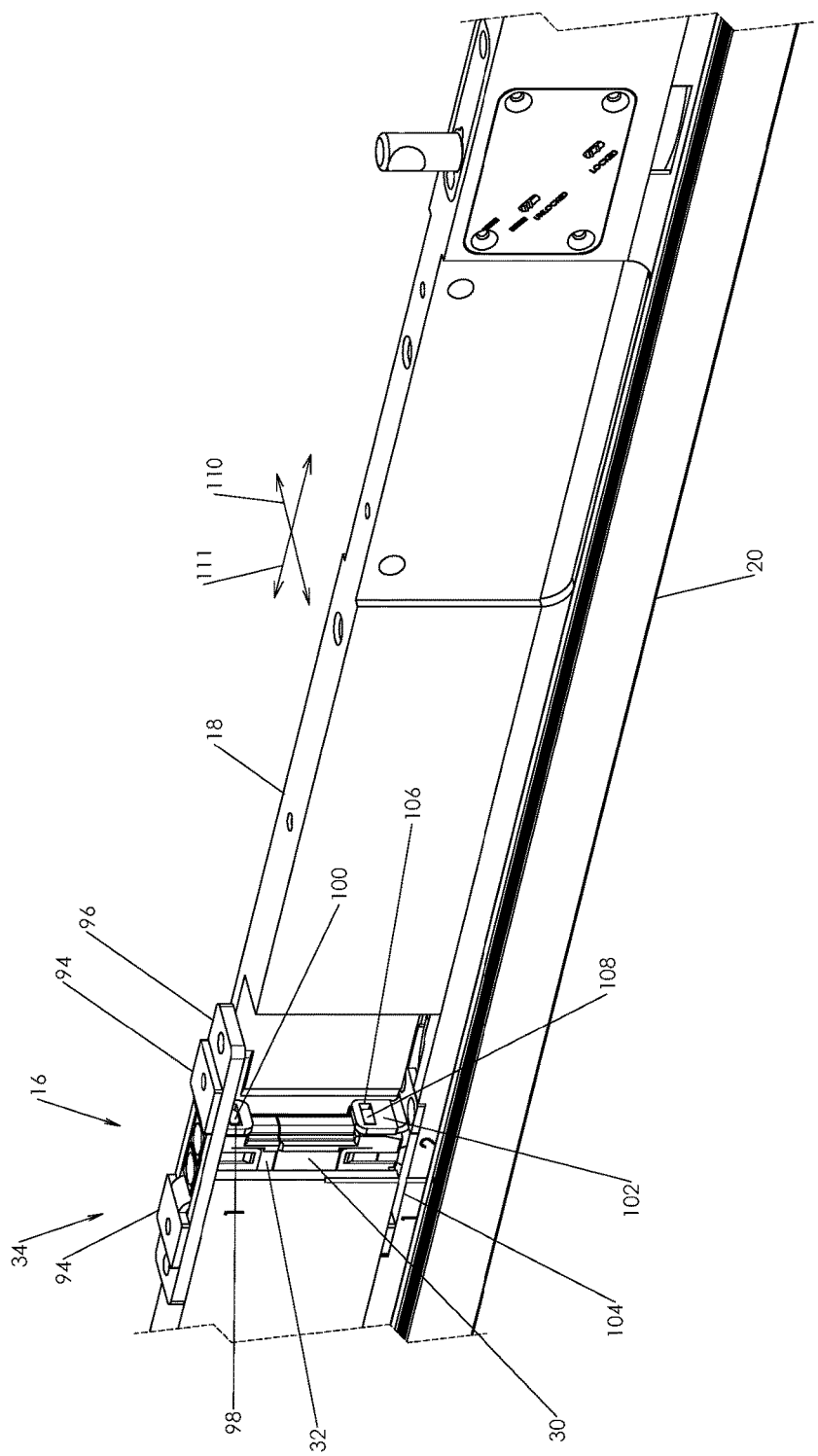
FIG. 13 is an enlarged partial upper perspective view of an exemplary compliant plug mount.
Figure 14:
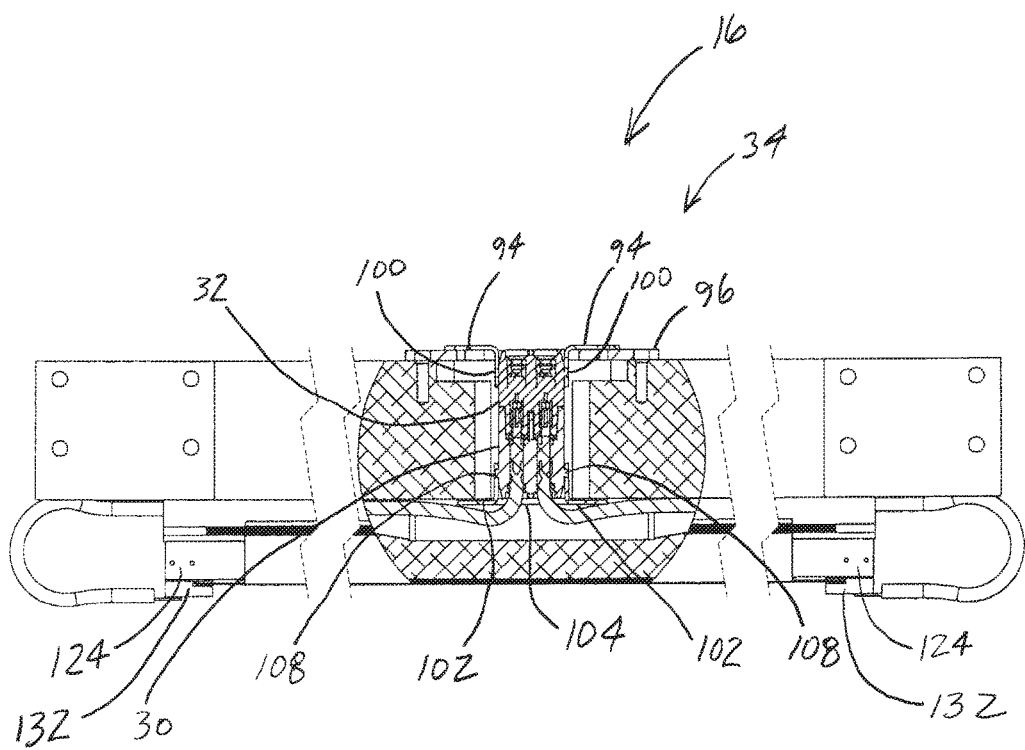
FIG. 14 is a partial cutaway view of an exemplary compliant plug mount.

FIGS. 13 and 14 show compliant plug mount 16. Compliant plug mount 16 includes connector mounting structure 34 for "floatably" securing electrical connector 32 in one plane. For example, an escutcheon plate 96 is secured to jaw holder 18. In addition, one leg of each L-bracket 94 of the pair of L-brackets 94 is secured to escutcheon plate 96, with the other leg of each L-bracket 94 having a slot 98 for engaging a corresponding tab 100 of electrical connector 32. Since each slot 98 is intentionally slightly longer than the corresponding tab 100, electrical connector 32 is movable within the difference in length between the corresponding slots 98 and tabs 100 of electrical connector 32. As shown in FIG. 13, this difference in length is substantially parallel to the upper surface of jaw holder 18.

As further shown in FIGS. 13 and 14, connector mounting structure 34 "floatably" secures electrical connector 30 in one plane. That is, connector mounting structure 34 provides compliant electrical connections. For example, an escutcheon plate 104 is secured to movable jaw 20. In addition, one leg of each L-bracket 102 of the pair of L-brackets 102 is secured to escutcheon plate 104, with the other leg of each L-bracket 102 having a slot 106 for engaging a corresponding tab 108 of electrical connector 30. Since each slot 106 is intentionally slightly longer than the corresponding tab 108, electrical connector 30 is movable within the difference in length between the corresponding slots 106 and tabs 108 of electrical connector 30. As shown in FIG. 13, this difference in length is substantially parallel to the upper surface of jaw holder 18.

Additional clearance is provided between fasteners securing the escutcheon plates 96, 104 to their respective jaw holder 18 and removable jaw 20, as well as between fasteners securing L-brackets 94, 102 and their corresponding escutcheon plates 96, 104. As a result of these clearances, planar "float" directions 110, 111 (FIG. 13) which is understood to include any other directions coplanar with directions 110, 111, are provided, permitting easier alignment between jaw holder 18 and removable jaw 20. It is to be understood that while "float" directions 110 only show four directional arrows, any directional movement within the plane established by the four directional arrows may be utilized.

FIGS. 15, 15a and 15b show orthogonal views of an enlarged prior art sealing jaw used with prior art bagging apparatus shown in FIG. 1. FIGS. 16, 16a and 16b show orthogonal views of sealing jaw 12, such as previously shown in FIG. 3, to permit a visual comparison with prior art sealing jaw of FIGS. 15, 15a and 15b. A number of differences between the sealing jaws are further discussed below.

Figure 17:
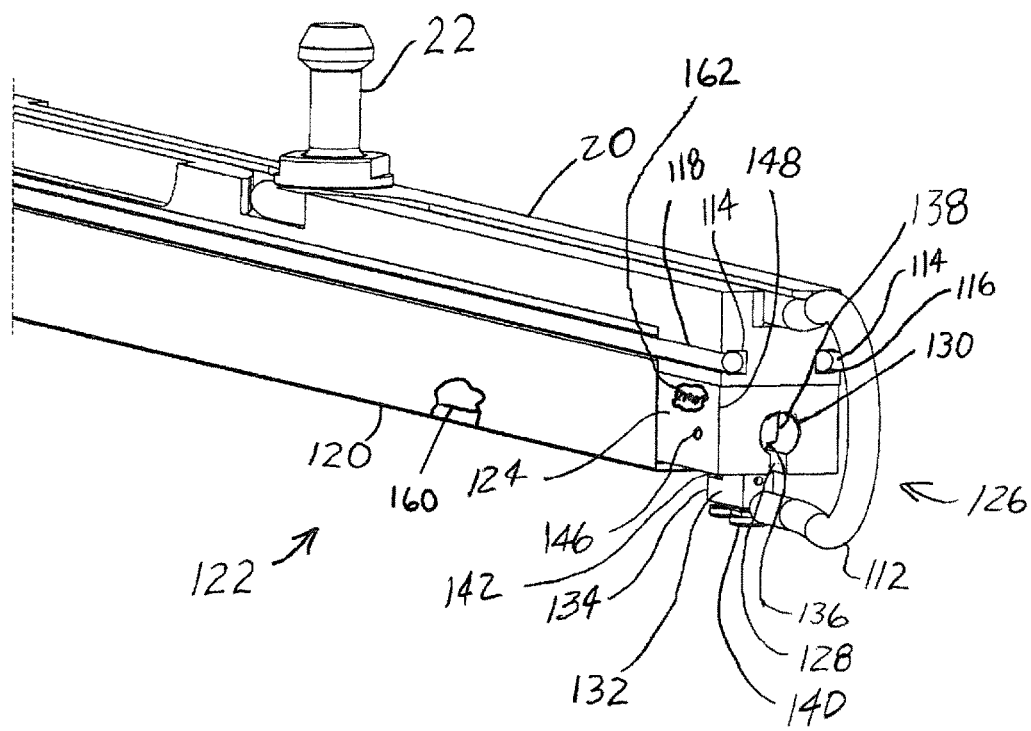
FIG. 17 is a partial upper perspective end view of a sheet material retention system.

FIG. 17 shows a partial removable jaw 20. An electrical conduit 112 carries electrical current through an electrically resistive wire, generating sufficient heat to permit formation of a seal between a pair of sheets when sealing jaws are brought together in contact with the sheets for forming a bag, which sealing jaws operating in a known manner. In another embodiment, other suitable sources capable of thermally forming seals in sheets for forming a bag may be used. However, current jaw constructions using a thermally conductive, low coefficient of friction material, such as Teflon® cloth, that permits formation of seals between sheets, while preventing the molten sheet material from adhering to the sealing jaw. These sheets are subject to wear, and must be replaced periodically. Such replacement, to date, has been cumbersome and time-consuming, such as a plate secured by fasteners, and additionally current jaw arrangements are incapable of easily providing a uniform amount of pressure to the sheet while applying the sheet to sufficiently cover the removable jaw 20.

As further shown in FIG. 17, removable jaw 20 includes a pair of opposed grooves 114. Grooves 114 are spaced to accommodate standard widths of cloth or sheet 120 to be applied over the end of the removable jaw 20. To secure the sheet, once sheet 120 overlays each groove 114, a retaining cord 118 is then inserted inside of groove 114. In one embodiment, retaining cord 118 extends substantially the entire length of each groove 114. In one embodiment, groove 114 includes at least one inwardly directed shoulder 116 extending at least intermittently along the groove 114. In another embodiment, groove 114 includes a pair of inwardly directed shoulders 116 extending substantially the entire length of the groove. This quick change sheet retention/removal system 122 has been found to significantly reduce installation time, while promoting more uniform tension during installation of the sheet.

FIG. 17 further shows removable jaw 20 including a pair of opposed slider blocks 124 (only one slider block visible in FIG. 17; see FIG. 14) having a keyway 126 formed therein in the longitudinal or elongated direction of removable jaw 20. Keyway 126 includes a slot 128 extending to an enlarged opening portion 130. Enlarged opening portion 130 does not extend through slider block 124, defining a blind opening. A non-electrically conductive slider 132 includes a base 134 extending to a neck 136 and terminating in a head 138. Head 138 and neck 136 are slidably received by the corresponding slot 128 and enlarged opening portion 130 of keyway 126 of slider block 124. Base 134 receives fasteners 140 for securing one end of electrical conduit 112, and a retention feature 142 for securing one end of an electrically resistive wire 160 that extends along sheet 120 to a corresponding retention feature 142 of an opposed slider 132 (not shown in FIG. 17). A spring 162 is positioned in enlarged portion 130 between the end defining the blind opening and head 138 of slider 132, the spring urging head 138 toward an end 148 of removable jaw 20, thereby stretching the electrically resistive wire between the opposed sliders 132. Slider blocks 124 each include an opening 146 for temporarily receiving a pin (not shown), such as a straightened paper clip, which act as a temporary stop in order to pre-set the tension in the wire. As a result of this novel construction, not only can electrically resistive wires be more easily replaced in a fraction of the time required with conventional jaws, but electrical testing can now be performed when removable jaw 20 has been disassembled from jaw holder 18, i.e., removed from the bagging apparatus. This testing capability provides greater reliability and less down time by providing the opportunity to confirm proper electrical connections at time of assembly of the removable jaw, versus previously requiring an untested conventional removable jaw to be fully assembled in the bagging apparatus. Only after assembly of the conventional removable jaw in the bagging apparatus would improper electrical connections occur, i.e., at an inopportune time.

It is to be understood that for purposes herein, the term "sheet" and "cloth" may be used interchangeably.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A sealing jaw for use with a bagging apparatus comprising:
   a removable jaw having a guide/retention member selectively releasable in a first direction from a jaw holder;
   the jaw holder comprising:
      a retainer assembly having a release member movable between a first position for securing the guide/retention member therewith, and a second position for releasing the guide/retention member therefrom; and
   wherein in response to a force being applied to the release member in a direction away from the jaw holder opposite the first direction urging the release member toward the first position, a dog is urged into engagement with the guide/retention member;
   wherein in response to a force being applied to the release member in a direction toward the jaw holder in the first direction urging the release member toward the second position, the release member urging the dog into disengagement with the guide/retention member.

2. The sealing jaw of claim 1, wherein the jaw holder includes a connector mounting structure supporting an electrical connector corresponding to an electrical connector of the jaw, the mounting structure of the jaw holder permitting coplanar movement of the jaw holder connector mounting structure in at least four directions.

3. The sealing jaw of claim 1, wherein at least one of the removable jaw and the jaw holder include a replaceable sheet retention/removal system.

4. The sealing jaw of claim 3, wherein the replaceable sheet retention/removal system is usable with a polytetrafluoroethylene sheet.

5. The sealing jaw of claim 1, wherein the removable jaw further comprises an electrically resistive wire tensioned by a spring, and the removable jaw is electronically testable when disassembled from the bagging apparatus.

6. The sealing jaw of claim 1, wherein a retention device selectably engages the release member for preventing inadvertent movement of the release member from the first position.

7. The sealing jaw of claim 6, wherein the retention device is manually disengageable from the release member.

8. The sealing jaw of claim 6, wherein component parts of the retention device are retained together when the retention device is disengaged from the release member.

9. The sealing jaw of claim 6, wherein the retention device is entirely positioned interior of the jaw holder.

10. The sealing jaw of claim 1, further comprising a visually evident indicator corresponding to a location of a dog positioned behind a cover plate including a window, wherein a portion of the dog is visually evident through the window in response to the release member being in the first position and the second position.

11. The sealing jaw of claim 1, wherein each force being applied to the release member is a manual force.

12. A method for assembling/disassembling a sealing jaw for use with a bagging apparatus comprising:
   inserting a guide/retention member of a removable jaw inside a retainer assembly of a jaw holder, the removable jaw selectively releasable in a first direction from the jaw holder, the retainer assembly having a release member movable between a first position for securing the guide/retention member therewith, and a second position for releasing the guide/retention member therefrom;
   applying a force to the release member in a direction away from the jaw holder opposite the first direction urging the release member toward the first position, a dog being urged into engagement with the guide/retention member, the force being applied prior to or subsequent to inserting the guide/retention member inside of the retainer assembly, thereby achieving assembly of the sealing jaw;
   subsequent to achieving assembly of the sealing jaw, applying a force to the release member in a direction toward the jaw holder in the first direction urging the release member toward the second position, the release member urging the dog into disengagement with the guide/retention member; and
   withdrawing the guide/retention member from the retainer assembly, achieving disassembly of the sealing jaw.

13. The method of claim 12, wherein each force applied to the release member is a manual force.

14. A sealing jaw for use with a bagging apparatus comprising:
   a removable jaw having a guide/retention member selectively releasable in a first direction from a jaw holder;
   the jaw holder comprising:
      a retainer assembly having a release member movable between a first position for securing the guide/retention member therewith, and a second position for releasing the guide/retention member therefrom; and
   wherein in response to a manual force being applied to the release member in a direction away from the jaw holder opposite the first direction urging the release member toward the first position, a dog is urged into engagement with the guide/retention member;
   wherein in response to a manual force being applied to the release member in a direction toward the jaw holder in the first direction urging the release member toward the second position, the release member urging the dog into disengagement with the guide/retention member.

* * * * *